Figure 1:
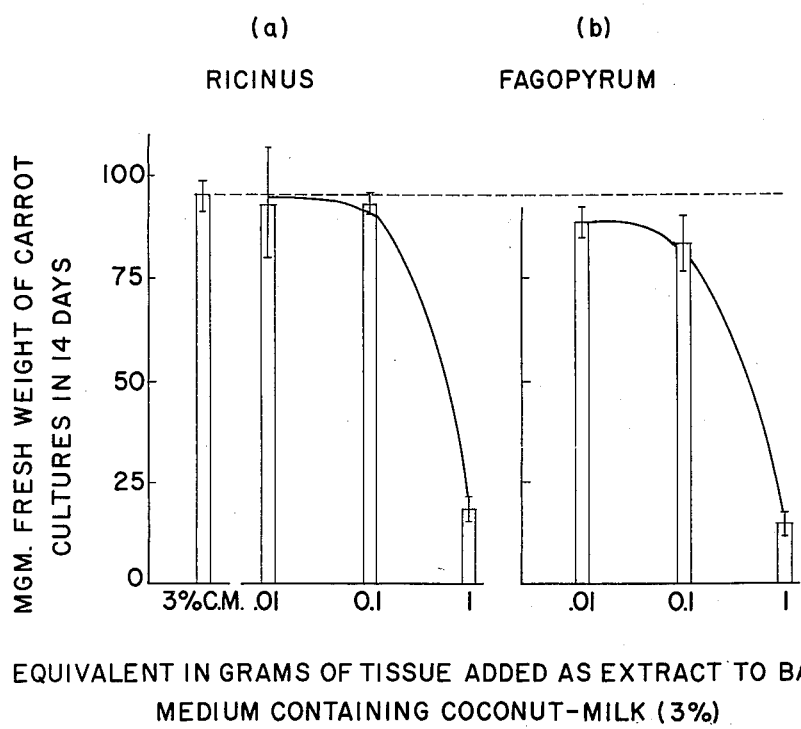

Feb. 28, 1956  F. C. STEWARD ET AL  2,736,645
COMPOSITIONS AND METHOD FOR REGULATING PLANT GROWTH
Filed Dec. 3, 1954

INVENTORS
FREDERICK C. STEWARD
& SAMUEL M. CAPLIN
BY
ATTORNEY

United States Patent Office 2,736,645
Patented Feb. 28, 1956

2,736,645

COMPOSITIONS AND METHOD FOR REGULATING PLANT GROWTH

Frederick C. Steward, Ithaca, and Samuel M. Caplin, Rochester, N. Y.

Application December 3, 1954, Serial No. 473,008

6 Claims. (Cl. 71—2.3)

This invention relates to compositions comprising coconut milk and an hydroxylic extract of tissue of a fruit or seed of the class consisting of castor bean and buckwheat. More particularly, this invention relates to compositions comprising coconut milk factor in admixture with a growth inhibitor for said coconut milk, the inhibitor being an hydroxylic extract of castor bean tissue or of buckwheat tissue.

This application is a continuation-in-part of our copending application, Serial No. 285,412, filed April 13, 1952, now abandoned.

In our copending application, Serial No. 285,411, now abandoned, but filed concurrently with our parent application, Serial No. 285,412, we have described the synergistic effect of compositions containing coconut milk and synthetic plant regulants such as 2,4-D on the promotion of growth of potato tissue. Our application Serial No. 473,006, filed December 3, 1954, is a continuation-in-part application of the then copending case, Serial No. 285,411.

We have now found surprisingly that upon substituting an hydroxylic extract of castor bean or of buckwheat for 2,4-D in a nutrient medium containing coconut milk the growth of certain plant tissues, such as for instance carrot root and Jerusalem artichoke tuber, is substantially inhibited.

The invention will be described with particular reference to the inhibition of the growth promoting qualities of coconut milk as determined by the carrot assay method but it is to be understood that the compositions of our invention inhibit the growth of other types of plant cells than those of the carrot root.

It is already known that the growth-promoting qualities of coconut milk, which enable rapid proliferative growth of the secondary phloem of carrot root to be obtained under tissue culture conditions, are due to a heat stable, water soluble substance or substances which are referred to hereinafter as the coconut milk growth factor (C. M. F.) The isolation and identification of C. M. F. are more fully described and claimed in the copending United States application of Frederick C. Steward and Edgar M. Shantz, Serial No. 365,182, filed June 30, 1953.

The growth factor can also be obtained from other sources notably immature corn (Zea) grains and other similar sources in which there is a relatively precocious growth of the endosperm.

The coconut milk factor, which is most conveniently found in the liquid endosperm of coconut, occurs at all stages after fertilization. In the immature fruit of Zea it is especially abundant about 2 weeks after pollination. The factor is also found in the developing female gametophyte of Ginkgo—as a representative of a haploid nutritive tissue, and in certain plant tumors in which cells return to the permanently proliferating state.

In addition to coconut milk the compositions of this invention contain an hydroxylic extract of a seed of the class consisting of castor bean and buckwheat.

By the term, an hydroxylic extract, we mean aqueous extracts, lower aliphatic alcoholic (1–6 carbon atoms) extracts, and aqueous lower aliphatic alcoholic extracts.

The hydroxylic extracts of castor bean and buckwheat tissue are prepared by any conventional method. The seed tissue in the fresh or dried state is preferably extracted with hot water, although the inhibitory substances can also be extracted by other hydroxylic solvents such as for instance, methyl alcohol, ethyl alcohol, n-propyl alcohol, isobutyl alcohol, n-amyl alcohol, isohexyl alcohol, and alcohol-water mixtures.

It will be understood that the living cells of the plant tissue are killed by the hot water, or by the alcohol during the extraction step. In the event the tissue is autoclaved the living cells are also killed, the soluble constituents thereupon diffusing out.

The resulting extract may be filtered. The filtrate may be further diluted preparatory to use in the compositions of our invention.

In operating in accordance with the present invention any suitable amount of the aforementioned plant extract may be used to inhibit the growth-promoting qualities of coconut milk on plant cells in any conventional nutrient medium, such as for instance, White's nutrient solution ("A Handbook of Plant Tissue Culture" by Philip R. White. The Jacques Cattell Press, Lancaster, Pa. 1943).

The relative proportions of a given extract with coconut milk will vary depending upon such factors as the particular extract employed, the plant material whose growth is to be inhibited, the physiological condition of the material so treated, and the environmental conditions.

It is impossible, therefore, to state exactly the proportions that will be used in all situations. In general, the compositions of the invention will contain inhibitory substances in an extract of from about 0.1 to 10 grams of plant tissue per 100 ml. of medium, said medium containing about at least 1%, preferably 3%, but not more than about 15% by volume of coconut milk or its equivalent of isolated C. M. F. factor.

It will be understood that the failure of mature plant cells to grow in the presence of a full nutrient containing compositions of the invention is due to the presence of inhibitors for the growth-promoting qualities of coconut milk and not to too much coconut milk growth factor.

The utility of the present invention resides in the control that it gives over the ability of plant cells to grow by division: the growth being promoted by one set of factors (as in the use of coconut milk) and repressed by another (as in the use of extracts of castor bean and buckwheat tissue with the claimed inhibitory actions.)

The nature of this invention will be better understood by reference to the following illustrative example:

Example

The inhibitory effect of two compositions of our invention on the growth of carrot explants in basal medium is illustrated by this example. The one composition contains coconut milk and an aqueous extract of castor bean (Ricinus) and the other contains coconut milk and an aqueous extract of buckwheat (Fagopyrum).

A description of the nutrient and other conditions under which standard explants of carrot roots can be accurately and reproducibly grown is found in our articles appearing in Nature 163, 920 (1949) and Ann. Bot. N. S. 16, 59 (1952).

In brief, our carrot assay method makes use of "Pyrex" glass culture tubes rounded at each end and mounted on disks which are slowly revolved about a horizontal shaft so that each tube is tumbled end over end. At the middle of each tube is a side neck through which the transfer of cultures can be made and, when plugged with cotton, through which gas exchange can occur.

The cultures in these klinostat tubes were grown on a basal nutrient medium having the following composition:

| Salts: | Mg./liter |
|---|---|
| $MgSO_4$ | 360.0 |
| $Ca(NO_3)_2$ | 200.0 |
| $Na_2SO_4$ | 200.0 |
| $KNO_3$ | 80.0 |
| $KCl$ | 65.0 |
| $NaH_2PO_4 \cdot H_2O$ | 16.5 |
| $Fe_2(C_4H_4O_6)_3$ | 2.5 |
| $MnSO_4$ | 4.5 |
| $ZnSO_4$ | 1.5 |
| $H_3BO_3$ | 1.5 |
| $KI$ | 0.75 |
| Sucrose | 20,000.0 |
| Glycine | 3.0 |
| Nicotinic acid | 0.5 |
| Pyridoxine | 0.1 |
| Thiamin | 0.1 |

All of the explants were obtained from carrot roots in the form of cylinders, removed by a cannula, and cut with a multibladed cutter into 3 mg. radial segments. Only phloem cylinders with their inner tangential surface 1 mm. from the cambium were used.

Hot water (about 50–80° C.) extracts of castor bean tissue and of buckwheat were made and added to the nutrient medium for carrot explants. The data shown in Figure 1 (a) and (b) are recorded in terms of the effect of castor bean and buckwheat seed tissue extracts on the growth of carrot explants under the above described standard conditions. These extracts suppress the growth of the explants substantially.

We claim:

1. A plant growth regulating composition comprising coconut milk and, in an amount sufficient to exert inhibitory action on the plant growth-promoting activity of coconut milk, a hydroxylic extract of plant tissue of a seed of the class consisting of castor bean and buckwheat, the extraction of from about 0.1 to 10 grams of said plant tissue yielding a hydroxylic extract containing an amount of an inhibitory substance sufficient to inhibit the growth-promoting activity of coconut milk, when said extract is mixed with 100 milliliters of nutrient medium containing from about 1 to 15% by volume of coconut milk.

2. A composition of claim 1 wherein the extract is an aqueous extract.

3. A composition of claim 1 wherein the extract is an alcoholic extract.

4. A plant growth regulating composition comprising coconut milk and, in an amount sufficient to exert inhibitory action on coconut milk-stimulated growth of plant cells, an aqueous extract of castor bean tissue, the aqueous extraction of from about 0.1 to 10 grams of said tissue yielding an extract containing an amount of an inhibitory substance sufficient to inhibit the growth-promoting activity of coconut milk on plant cells in 100 milliliters of nutrient medium containing about 3% by volume of coconut milk.

5. A plant growth regulating composition comprising coconut milk and, in an amount sufficient to exert inhibitory action on coconut milk-stimulated growth of plant cells, an aqueous extract of buckwheat tissue, the aqueous extraction of from about 0.1 to 10 grams of said tissue yielding an extract containing an amount of an inhibitory substance sufficient to inhibit the growth-promoting activity of coconut milk on plant cells in 100 milliliters of nutrient medium containing about 3% by volume of coconut milk.

6. A method which comprises applying to plant tissue a composition containing coconut milk and, in an amount sufficient to exert inhibitory action on the plant growth-promoting activity of coconut milk, a hydroxylic extract of plant tissue of a seed of the class consisting of castor bean and buckwheat, the extraction of from about 0.1 to 10 grams of said plant tissue yielding a hydroxylic extract containing an amount of an inhibitory substance sufficient to inhibit the growth-promoting activity of coconut milk, when said extract is mixed with 100 milliliters of nutrient medium containing from about 1 to 15% by volume of coconut milk.

References Cited in the file of this patent

"Science," vol. 108, Dec. 10, 1948, pages 655 to 657.

"Cosmopolitan Fish Cookery for the Phillipines," U. S. Dept. of the Interior, Fish and Wildlife Service—Avery Leaflet 377 (Rec'd. in U. S. Patent Office Library Aug. 18, 1950), pages 28 and 29.